(No Model.)
H. T. YARYAN.
APPARATUS FOR VACUUM DISTILLATION.
No. 300,185. Patented June 10, 1884.
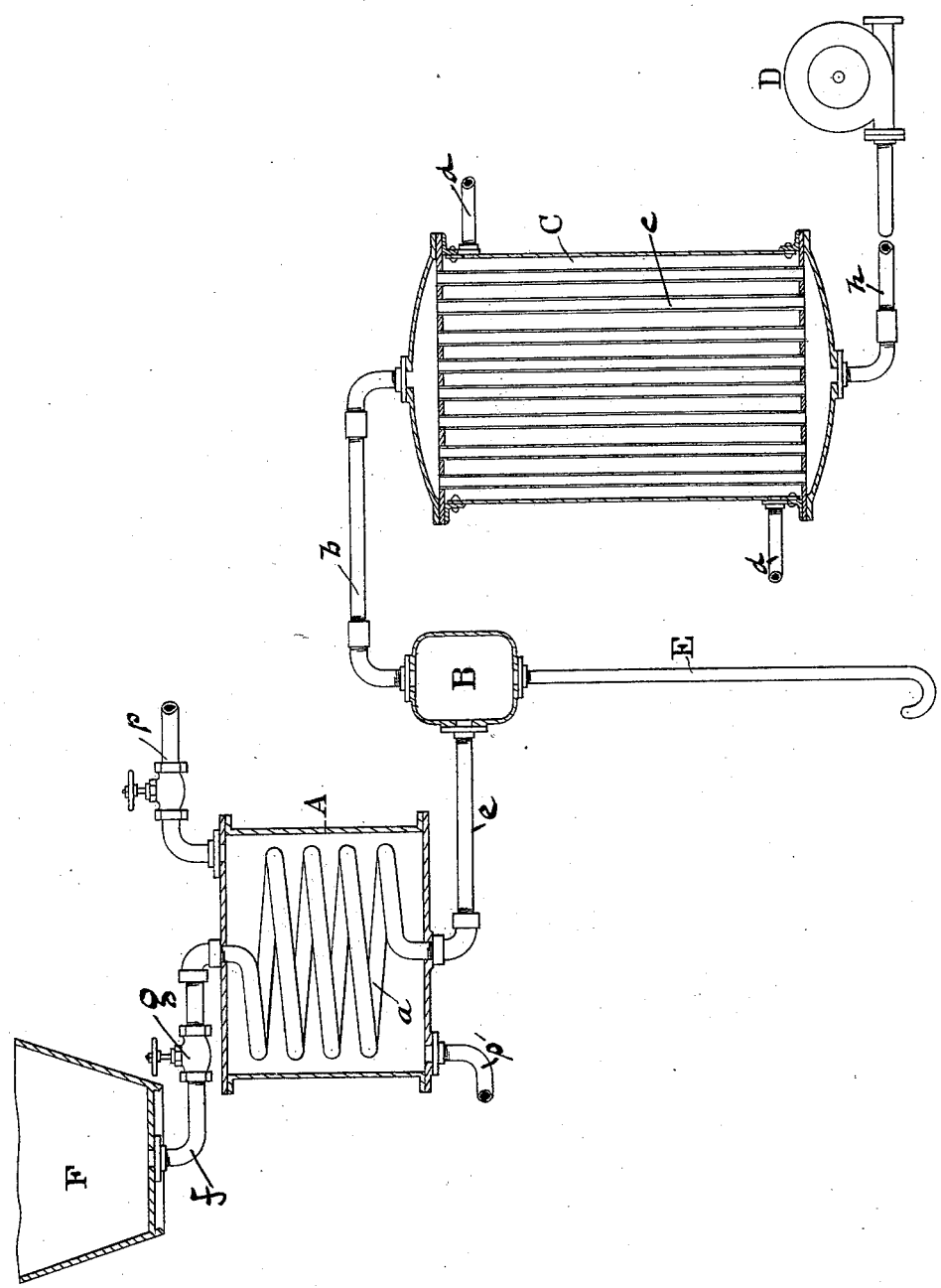
Attest.
Rudolph Werner
C Shappell
Inventor.
Homer T. Yaryan
By L. M. Hosea, Attorney

United States Patent Office.

HOMER T. YARYAN, OF TOLEDO, OHIO.

APPARATUS FOR VACUUM DISTILLATION.

SPECIFICATION forming part of Letters Patent No. 300,185, dated June 10, 1884.

Application filed November 26, 1883. (No model.)

*To all whom it may concern:*

Be it known that I, HOMER T. YARYAN, a citizen of the United States, residing at Toledo, Ohio, have invented new and useful Improvements in Apparatus for Vacuum Distillation, of which the following is a specification.

My invention relates to vacuum distillation, its object being to improve the apparatus employed, as hereinafter pointed out.

In the ordinary operations of vacuum distillation a "vacuum-pan" is employed, consisting, substantially, of a large copper or iron vessel for holding the liquid to be evaporated, and provided with steam-coils at the bottom of said vessel for heating the liquid.

Among the difficulties attending the process as ordinarily followed are, that by reason of the necessity of dealing with only the immediate contents of the vessel at one operation the process is not continuous, and time and labor are lost in the frequent replenishing required. Moreover, owing to the length of time during which the liquid is necessarily exposed to heat, in many cases the color is injured and the value of the ultimate product impaired, while in the case of saccharine solutions this prolonged exposure to heat tends to convert crystallizable into uncrystallizable sugar. Further, in order to deal with a sufficient quantity for commercial practicability at each replenishing, a vessel of large dimensions is required, thereby entailing large original outlay, besides increased cost in maintaining a vacuum and a large waste of heat by radiation from so large an exposed surface. In such pans a large inner space must be allowed for frothing, to prevent loss in boiling over, and the entire operation thus necessitates constant and highly skilled attention to prevent turbulent boiling.

In the apparatus and by the method constituting the subject of my present invention these difficulties are largely overcome; and to this end my invention may be said to consist in substituting for the ordinary vacuum-pan and its operations a vacuum-coil or its equivalent inclosed in a heating-vessel, and connecting the same with a gravity separating-trap, a condenser, and an exhaust-pump, in such manner that the vaporizable solution is passed continuously in regulated quantity into and through the heating-coil *in vacuo*, the heavier and non-volatilizable constituent being trapped off and the vapors condensed without any cessation of the operation, and with a great economy of cost and labor, and with far greater certainty in results.

I have shown in the accompanying drawing, for the purpose of illustrating the principle of my invention, a simple form of apparatus in which the same is embodied, various constructive modifications of which will doubtless suggest themselves to those skilled in these arts in adapting the apparatus to special cases.

The apparatus shown consists of a vessel, F, containing the solution to be treated; a steam-drum, A, inclosing the coil $a$; a separating-trap, B, into which the coil $a$ ultimately discharges; a condenser, C, connected with the trap B by a vapor-pipe, $b$; an exhauster, D, of any approved form or construction, and certain other minor parts, more fully to be described. These features of the apparatus are arranged and connected as follows: From the tank F a pipe, $f$, leads downward through a regulating-valve, $g$, and connects with the coil $a$. The latter is arranged within a close drum, A, furnished with ingress and exit pipes $p\ p'$, for the passage of steam or other heating medium. At the bottom of the drum the coil $a$ connects with a pipe, $e$, leading thence to a chamber or vessel, B, having a pipe, E, leading downward from the bottom, and provided with a U-bend at its lower terminus to form a "seal" by means of the contained liquid, as hereinafter described. From the top of the chamber B a pipe, $b$, leads over into a condenser, C, of any suitable kind, that shown being a vertical cylinder provided with numerous small tubes $c$ and ingress and exit pipes $d\ d'$, through which a current of cooling-liquid is passed through the cylinder surrounding the tubes $c$, and, finally, with an exit-pipe, $h$, connecting with the vapor-pump or exhauster D.

The operation is as follows: Steam or other heating medium being admitted to the drum A, surrounding the coil $a$, and cold water or other cooling medium into the drum C, surrounding the pipe $c$, the exhauster or pump D is set in motion (there being already fluid in the "barometric column" E) and a partial vacuum produced in the coil $a$ and its subsequent connections. The regulating-valve $g$ is then slightly opened and the solution contained in the tank F allowed to pass in limited quantity into the coil $a$. In passing downward through the coil $a$ *in vacuo* under the influence of heat, the volatile constituents of the solution are vaporized, and on reaching the separating-vessel B the fluid constituent falls into the column E, while the vapor passes over into the condenser C through the pipe $b$. The contents of the column E operates as a valve or seal, being sustained at a given height by pressure of the external atmosphere, and the overflow takes place constantly from the extremity of the bent tube as the volume of liquid suspended in the column is increased.

It will be obvious that for the coil $a$ inclined plates may be substituted, or other modifications for obtaining a larger surface for exposure for the solution under treatment.

The apparatus and process hereinbefore described may be used with great advantage also in the separation of the solvent used in the process of extracting oils from oil-bearing substances by solution, and to this extent may be considered as an improvement upon the inventions patented to me June 25, 1878, No. 205,328, and July 2, 1878, No. 205,516, inasmuch as the separation of the oil and solvent being there effected by vaporization of the latter, by this improvement is effected *in vacuo* at a lower temperature and more thoroughly, besides avoiding all risk of oxidizing or otherwise deteriorating the quality of the oil by heat.

Certain other modifications of the apparatus may be employed—such, for example, as inclosing the pipe $a$ in a larger one and introducing steam or hot air into the larger pipe surrounding the coil, such being obviously the mechanical equivalent merely of the drum A.

The ordinary vacuum-pan may also be employed in conjunction with the other apparatus described, in which case it would take the place of the separating-chamber B, and the tail-pipe $e$ be dispensed with; but such would also be the substitution of mechanical equivalents, with the difference only of permitting the evaporation to be conducted in a more nearly perfect vacuum.

It will also be obvious that where no necessity exists for the final recovery of the separated vapors the condenser may be dispensed with.

I claim and desire to secure by Letters Patent—

1. In a vacuum-distillation apparatus, the combination of the coil $a$, surrounded by steam or other heating medium, separating-chamber B, vacuum-pump D, and pipe-connections, substantially as and for the purpose set forth.

2. The combination of the coil $a$, surrounded by steam or other heating medium, the separating-chamber B, tail-pipe E, vapor-pipe $b$, condenser C, and exhaust-pump D, substantially as and for the purpose set forth.

3. The combination of the coil $a$, surrounded by steam or other heating medium, the separating-chamber B, tail-pipe E, vapor-pipe $b$, regulating-valve $g$, and exhaust-pump D, substantially as and for the purpose set forth.

In testimony whereof I have hereunto set my hand in the presence of two subscribing witnesses.

HOMER T. YARYAN.

Witnesses:
E. A. POPE,
F. B. DODGE.